(12) United States Patent
Mo et al.

(10) Patent No.: US 11,258,655 B2
(45) Date of Patent: Feb. 22, 2022

(54) HOLO-ENTROPY BASED ALARM SCORING APPROACH

(71) Applicant: VMware, Inc., Palo Alto, CA (US)

(72) Inventors: Zhen Mo, Sunnyvale, CA (US); Dexiang Wang, Sunnyvale, CA (US); Bin Zan, Santa Clara, CA (US); Vijay Ganti, Fremont, CA (US); Amit Chopra, Sunnyvale, CA (US); Ruimin Sun, Gainesville, FL (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/212,170

(22) Filed: Dec. 6, 2018

(65) Prior Publication Data

US 2020/0186409 A1 Jun. 11, 2020

(51) Int. Cl.
*H04L 12/24* (2006.01)
*G06F 9/455* (2018.01)

(52) U.S. Cl.
CPC ...... *H04L 41/0609* (2013.01); *G06F 9/45558* (2013.01); *H04L 41/069* (2013.01); *G06F 2009/45587* (2013.01)

(58) Field of Classification Search
CPC .. G06F 9/45558; G06F 11/079; H04L 41/069; H04L 63/1425; H04L 63/1441
See application file for complete search history.

(56) References Cited

U.S. PATENT DOCUMENTS

| | | | |
|---|---|---|---|
| 9,692,662 B2 | 6/2017 | Chan et al. | |
| 10,177,998 B2 | 1/2019 | Parandehgheibi et al. | |
| 10,223,748 B2 | 3/2019 | Hunter et al. | |
| 10,255,124 B1 | 4/2019 | Bellingan et al. | |
| 2016/0080404 A1* | 3/2016 | Kohout | H04L 63/1425 726/23 |
| 2017/0070521 A1 | 3/2017 | Bailey et al. | |
| 2017/0090996 A1* | 3/2017 | Birke | G06F 9/5011 |
| 2017/0277727 A1 | 9/2017 | Chen et al. | |
| 2017/0295078 A1* | 10/2017 | Medas | H04L 41/0631 |
| 2018/0020015 A1* | 1/2018 | Munro | G06F 21/552 |
| 2018/0173894 A1* | 6/2018 | Boehler | G06F 21/6254 |

(Continued)

OTHER PUBLICATIONS

"Series M: TMN and Network Maintenance:International Transmission Systems,Telephone Circuits, Telegraphy, Facsimileand Leased Circuits ", Feb. 2000, ITU, M.3400. (Year: 2000).*

(Continued)

*Primary Examiner* — Hitesh Patel
*Assistant Examiner* — Eui H Kim
(74) *Attorney, Agent, or Firm* — Patterson + Sheridan, LLP (57) ABSTRACT

A method for managing alarms in a virtual machine environment includes receiving alarm data related to a process and storing the alarm data in a database, where the alarm data comprises one or more features. The method further includes retrieving intended state information for the process and comparing the one more features of the alarm data to the intended state information to determine whether the alarm is an outlier. The method also includes computing a normal score for the alarm if the alarm is not an outlier, and computing an abnormal score for the alarm if the alarm is an outlier. The method also includes sending a notification for the alarm and the computed score.

11 Claims, 4 Drawing Sheets

(56) References Cited

U.S. PATENT DOCUMENTS

| | | | |
|---|---|---|---|
| 2018/0324199 A1* | 11/2018 | Crotinger | G06F 16/248 |
| 2019/0173899 A1* | 6/2019 | Tews | H04L 63/1433 |
| 2019/0220336 A1* | 7/2019 | Maya | G06F 11/0709 |
| 2019/0387005 A1* | 12/2019 | Zawoad | H04L 63/1425 |
| 2020/0019698 A1 | 1/2020 | Mo et al. | |
| 2020/0174867 A1 | 6/2020 | Mo et al. | |

OTHER PUBLICATIONS

Zhihua Zhou, "Ensemble Methods: Foundations and Algorithms," Chapman & Hall/CRC, 2012.

"Quick Introduction to Boosting Algorithms in Machine Learning", https://www.analyticsvidhya.com/blog/2015/11/quick-introduction-boosting-algorithms-machine-learning, 2015.

Yoav Freund, Robert E. Schapire, "A decision-theoretic generalization of on-line learning and an application to boosting", Journal of Computer and System Sciences, 1997.

Jerome H. Friedman, "Greedy Function Approximation: A Gradient Boosting Machine", Annals of Statistics, 2000.

Tianqi Chen and Carlos Guestrin, XGBoost: A Scalable Tree Boost-ing System, Proceedings of the 22Nd ACM SIGKDD International Conference on Knowledge Discovery and Data Mining, 2016.

Shannon, C. E., "A Mathematical Theory of Communication", Bell System Technical Journal, 1948.

Attack: Microsoft Windows LSASS Memory Corruption, https://www.symantec.com/security_response/attacksignatures/detail.jsp?a sid=22582.

Shu Wu, Shengrui Wang, "Information-Theoretic Outlier Detection for Large-Scale Categorical Data", IEEE Transactions on Knowledge and Data Engineering, 2013.

Mazzawi, Hanna et al., Anomaly Detection in Large Databases using Behavioral Patterning, Dec. 2017, IEEE 33rd International Conference on Data Engineering, pp. 1140-1149.

\* cited by examiner

HOLO-ENTROPY BASED ALARM SCORING APPROACH

BACKGROUND

Software defined networking (SDN) comprises a plurality of hosts in communication over a physical network infrastructure, each host having one or more virtual computing instances (VCIs) such as virtual machines (VMs) or containers that are connected to logical overlay networks that may span multiple hosts and are decoupled from the underlying physical network infrastructure. Applications running on such VMs are susceptible to malicious attacks. Though certain embodiments are discussed herein with respect to VMs, it should be noted that other virtual computing instances, or in some cases, other user devices, may be used.

Virtual machine environments utilize various security features to detect threats to the environment. One such feature monitors processes running on the virtual machines to determine the behavior pattern of the processes. After learning the pattern, any behavior deviated from the pattern is treated as a potential threat, and a corresponding action is taken to handle the threat. AppDefense™ from VMware, Inc. in Palo Alto, Calif. is a product that aims to protect against malicious attacks on VMs and cloud environments. AppDefense™ is a data center endpoint security product that protects applications running on VMs in logical networks.

AppDefense™ and other security products rely on a history-based learning method that works in two modes: discovery mode and protected mode. First, virtual machines are placed in the discovery mode for a period of time. In discovery mode, the behavior of the processes is observed and converted into rules. Then, the virtual machines are migrated to protected mode. In protected mode, alerts are generated for any behavior that violates the previously learned rules. Users or system administrators can define different remediation policies based on the type of alert.

One issue with this approach is that it is unclear how long the discovery mode should be. If discovery mode is too short, false positive alarms can occur caused by events that weren't detected during the discovery mode. Also, changes to the system such as operating system updates and new software can create new harmless events that did not occur during the discovery period.

Additionally, when a true alarm is observed, it may be unclear to the user or system administrator how serious the issue is. Some alarms may be critical while others may not.

SUMMARY

Described herein is a solution, which may be implemented in any number of alternate embodiments, to the problem described above by using a holo-entropy based scoring approach. In an embodiment, a method for managing alarms in a virtual machine environment includes receiving alarm data related to a process and storing the alarm data in a database, where the alarm data comprises one or more features. The method further includes retrieving intended state information for the process and comparing the one or more features of the alarm data to the intended state information to determine whether the alarm is an outlier. The method also includes computing a score comprising a normal score for the alarm if the alarm is not an outlier, and computing a score comprising an abnormal score for the alarm if the alarm is an outlier. The method also includes sending a notification for the alarm and the computed score.

Further embodiments include a non-transitory computer-readable storage medium comprising instructions that cause a computer system to carry out the above method. Other embodiments include a processor and a memory that includes a program executable in the processor to perform operations to carry out the above method.

DETAILED DESCRIPTION

Embodiments herein provide techniques for providing security in a virtual machine environment. For certain processes that run on a virtual machine, such as operating system processes, each process has a behavior pattern that has some similarities among different instances running on different virtual machines. Those behavior patterns are referred to as "intended states" of the process. It is possible for a process to have multiple intended states, but it is unlikely for a process instance to have a completely different behavior pattern across various virtual machines, especially operating system processes. Once a process's intended states are observed, the intended states can be used as a baseline to determine whether an alarm indicating a deviation from the baseline is valid or not using an outlier detection algorithm.

Holo-entropy based outlier detection is used in embodiments herein. Holo-entropy is a technique for identifying one or more outliers (or unwanted behaviors) in a data set (e.g., a digital profile). Shu Wu and Shengrui Wang in Information-Theoretic Outlier Detection for Large-Scale Categorical Data, *IEEE Transactions on Knowledge and Data Engineering*, 2013, disclosed a "holo-entropy computation" to identify a user defined number of outliers (K) in a data set by identifying (K) data points that contribute most to the entropy of the data set.

In embodiments described herein, an intended state database for each process is maintained. When an alarm of a process is observed, a data record is created by extracting features from the alarm. The data record is added to the process's intended states and a new dataset is constructed. After running a holo-entropy method, it is determined whether the alarm is an outlier in the new dataset. Also, a scoring approach is used to calculate either a normal score or an abnormal score for each alarm. In some embodiments, alarms that are outliers receive abnormal scores while alarms that are not outliers receive normal scores. Administrators, customers, or users can choose to treat normal alarms differently than abnormal alarms.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. Of course, alternative embodiments of the structures and method illustrated herein may be employed without departing from the principles described herein.

Figure 1:
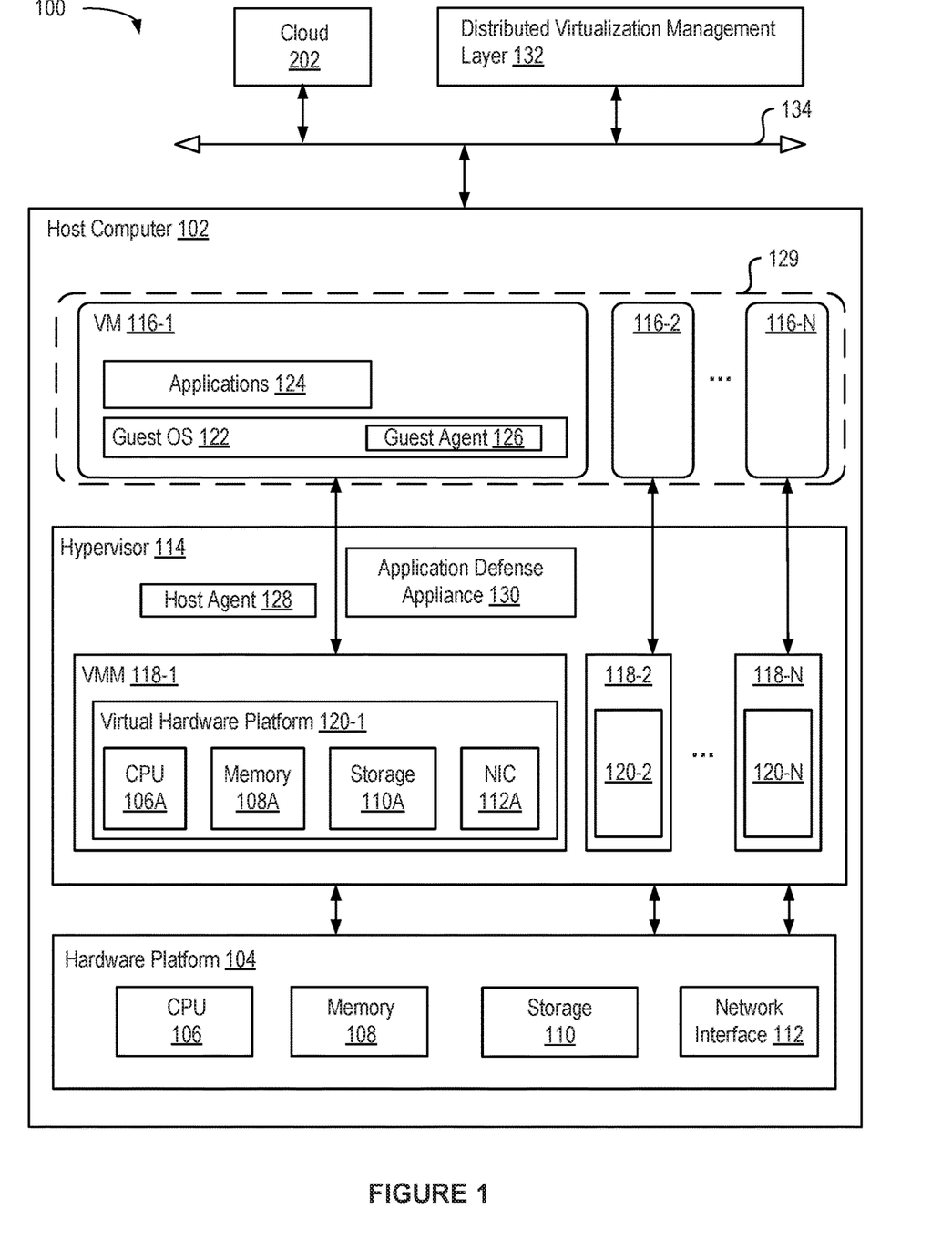
FIG. 1 illustrates a computing system that implements one or more embodiments herein.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple resource consumers, such as virtual machines (VMs) 116 (or more generally referred to as "virtual computing instances") that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc. of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 129. Virtual storage 110A is commonly known as a virtual disk and hypervisor 114 provisions the virtual disk as one or more files in a file system managed by hypervisor 114.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122. Guest OS 122 further includes a guest agent 126 that performs actions associated with the methods described herein. Hypervisor 114 further comprises one or more host agents 128 that coordinate operations at the hypervisor 114 according to embodiments herein. Application defense appliance 130 facilitates communication between the host 102 and components in cloud 202. Host 102 communicates with cloud 202 and distributed virtualization management layer 132 via network 134. Host 102 utilizes network interface 112 to couple to network 134.

Computing system 100 includes distributed virtualization management layer 132 that communicates with the one or more hosts 102. Distributed virtualization management layer 132 is configured to carry out administrative tasks for the computing system 100, including managing hosts 102, managing VMs running within each host 102, provisioning VMs, migrating VMs from one host to another host, and load balancing between hosts 102. In one embodiment, distributed virtualization management layer 132 is a computer program that resides and executes in a central server, which may reside in computing system 100, or alternatively, running as a VM in one of hosts 102. One example of a distributed virtualization management layer 132 is the ESX-Cloud product made available from VMware, Inc. A distributed virtualization management layer 132 may comprise a distributed architecture made up of a plurality of nodes. Nodes can comprise microservices, VMs, or containers, or other resource consumers running on hosts in some embodiments.

Figure 2:
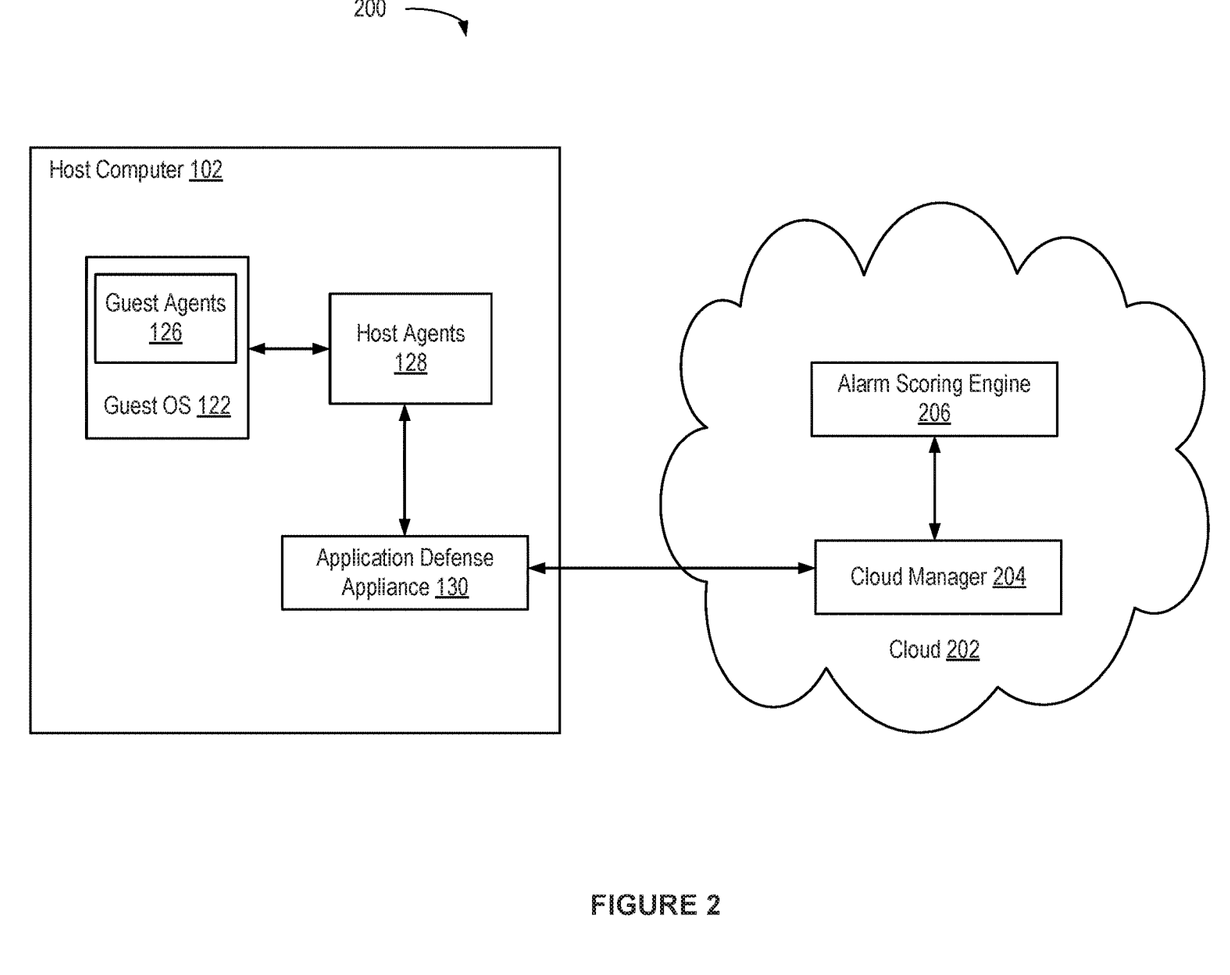
FIG. 2 illustrates components of the computing system that are used to implement one or more embodiments herein.

FIG. 2 illustrates components of host 102 and cloud 202 that are used to implement the embodiments described herein. As illustrated in FIG. 1, guest agents 126 reside in guest OS 122 on host 102. Also residing on host 102 are host agents 128 and application defense appliance 130. Application defense appliance 130 facilitates communication regarding alarms with cloud 202. Cloud 202 comprises a cloud manager 204 that stores data and runs logic to handle alarms and perform other tasks as described herein. Cloud 202 includes hardware resources, storage resources, and networking resources (not shown). Hardware resources may include a number of physical servers/hosts (e.g., hosts 105). Storage resources may include a storage area network (SAN), distributed virtual SAN, or network-attached storage (NAS) and other network data storage systems. Networking resources may include switches, routers, and other network devices for connecting hosts together, hosts to storage resources, and hosts with network entities outside cloud 202.

In one aspect, cloud 202 is configured as a dedicated cloud service for a single tenant comprised of dedicated hardware resources. In other aspects, cloud 202 is configured as part of a multi-tenant cloud service with logically isolated virtualized computing resources on a shared physical infrastructure. Processes and applications can be executed on the hardware resources of cloud 202. For example, processes and applications can be directly executed on hosts of cloud 202, or in VMs or other virtual entities running on hosts of cloud 202. These processes and application may communicate with one another over the network resources, or may even be located on the same hardware resource.

Cloud 202 further comprises alarm scoring engine 206. Alarm scoring engine 206 determines whether an alarm is an outlier or not, and whether an alarm is abnormal or not, as described in further detail below.

To perform the method according to an embodiment, an intended states database 312 (illustrated in FIG. 3) is constructed. The first step of constructing an intended states database 312 is for an administrator to pick candidate processes running on the virtual machines 116 that will be monitored for alarms. Various considerations may be taken into account by an administrator when selecting candidate processes. In addition, any number of criteria may be used to pick candidate processes. In one example embodiment, three criteria are used. First, the candidate process should commonly exist in most virtual machines 116. If the process exists in many virtual machines, more virtual machines can be protected than processes that exist in only a smaller number of virtual machines. Second, candidate processes should relate to network behaviors. In many virtual computing systems, most alarms are related to network behaviors, so selecting processes that relate to network behaviors will capture these alarms. Third, processes that have been utilized by previous attacks are good candidates for selection. If a process has been compromised in the past, it is likely to be attacked again in the future.

In one example, based on the above three criteria, a good candidate process group is operating system processes. Ideally, an intended state database could be constructed for all operating system processes. However, that complete coverage would be difficult to accomplish due to system processes that either only exist in some specific version of operating systems or that only exhibit a few network behaviors. These types of processes would be rarely used and it would be difficult and time consuming to collect enough valid data records for the intended states database.

Accordingly, in the example embodiment described herein, eight Windows® system processes are selected as the initial candidate process set. Other processes may be selected in other embodiments, such as for the same or other operating systems. The eight processes selected herein run on most Windows® systems and create a number of network behaviors. There are also many known attacks that utilize these system processes. The eight processes are listed below in Table 1.

TABLE 1

| | |
|---|---|
| 1 | C:\Windows\system32\lsass.exe |
| 2 | C:\Windows\system32\services.exe |
| 3 | C:\Windows\System32\spoolsv.exe |
| 4 | C:\Windows\system32\svchost.exe -k Local Service |
| 5 | C:\Windows\System32\svchost.exe -k netsvcs |
| 6 | C:\Windows\system32\svchost.exe -k NetworkService |
| 7 | C:\Windows\System32\svchost.exe -k utcsvc |
| 8 | System |

After the processes are selected, network behaviors of these processes can be observed in a testing environment. All network connections made by the processes are recorded. An example connection observed from one process is illustrated below:

id|remote_address|remote_port|created_at|updated_at|allowed_behavior_id|connection_type|destination_service_id|created_by_id|local_address|local_port|protocol origin
69082|10.250.0.2|389|2018-03-09 21:54:14.214-08|2018-03-09 21:54:14.214-08|16469 OUT| |647|*|*|TCP|DISCOVERED Some of these fields are more important for this purpose than others. The remote_address field is the remote address of the connection. The remote_port field is the remote port number of the connection. The connection_type shows whether the connection is outbound or inbound. The local_address is the local address of the connection. The local_port is the local port number of the connection. The protocol is either "TCP" or "UDP."

Based on the behaviors observed, features can be extracted and defined. These features can make up a data set of records that define an intended state of a process. In an example embodiment of a number of features illustrated below in Table 2, all the features are Boolean values. The first 12 features are fixed, while features 13 to 24 are dynamically generated according to the number of inbound and outbound connection on well-known ports. Port numbers in the range from 0 to 1023 are referred to as well-known ports or system ports. The well-known ports are used by system processes that provide common network services.

TABLE 2

| Index | Feature Name | Data Type | Explanation |
|---|---|---|---|
| 1 | outgoingIPv4HasPublic | bool | Connected to outbound public IPv4 address |
| 2 | outgoingIPv4hasPrivate | bool | Connected to outbound private IPv4 address |
| 3 | outgoingIPv6hasPublic | bool | Connected to outbound public IPv6 address |
| 4 | outgoingIPv6hasPrivate | bool | Connected to outbound private IPv6 address |
| 5 | outgoingHasEphemeralTCPPort | bool | Connected to outbound ephemeral TCP port |
| 6 | outgoingHasEphemeralUDPPort | bool | Connected to outbound ephemeral UDP port |
| 7 | outgoingHasTCPOtherPort | bool | Connected to outbound other TCP port |
| 8 | outgoingHasUDPOtherPort | bool | Connected to outbound other UDP port |
| 9 | inboundHasEphemeralTCPPort | bool | Has inbound connection on ephemeral TCP port |
| 10 | inboundHasEphemeralUDPPort | bool | Has inbound connection on ephemeral UDP port |
| 11 | inboundHasOtherTCPPort | bool | Has inbound connection on other TCP port |
| 12 | inboundHasOtherUDPPort | bool | Has inbound connection on other UDP port |
| 13 | outgoingWellKnownTCPPort_X1 | bool | Connected to outbound TCP well-known port X1 |
| 14 | ... | ... | ... |
| 15 | outgoingWellKnownTCPPort_Xn | bool | Connected to outbound TCP well-known port Xn |
| 16 | outgoingWellKnownUDPPort_Y1 | bool | Connected to outbound UDP well-known port Y1 |
| 17 | ... | ... | ... |
| 18 | outgoingWellKnownUDPPort_Yn | bool | Connected to outbound UDP well-known port Yn |
| 19 | inboundWellKnownTCPPort_Z1 | bool | Has inbound connection on TCP well-known port Z1 |
| 20 | ... | ... | ... |
| 21 | inboundWellKnownTCPPort_Zn | bool | Has inbound connection on TCP well-known port Zn |
| 22 | inboundWellKnownUDPPort_P1 | bool | Has inbound connection on UDP well-known port P1 |
| 23 | ... | ... | ... |
| 24 | inboundWellKnownUDPPort_Pn | bool | Has inbound connection on UDP well-known port Pn |

As an example, if a process instance made outbound TCP connections on port 445 and port 80, and made inbound UDP connections on port 43, then three features will be created: outgoingWellKnownTCPPort_445, outgoingWellKnownTCPPort_80, and inboundWellKnownUDPPort_43.

After features have been extracted and defined, entropy can be used to find features that are outliers. Entropy as used in information theory means uncertainty to a random variable. Generally, entropy is a measure of the order or consistency of a plurality of data points in a data set. The lower the entropy, the more consistent the data set is as a whole. In one embodiment, a data record (i.e., a feature) is a good outlier candidate for removal from the data set if that removal causes a significant decrease on the entropy of the data set. In this example, the data set is the collection of all features that correspond to an intended state of a particular process. It can be computationally complex to employ the method of removing each data record and calculating the entropy of the data set. Instead, in embodiments described herein a value called outlier factor is computed for each data record in the set to measure whether the data record is an outlier. If a data record (i.e., the feature) is an outlier, an abnormal alarm can be indicated.

The outlier factor (OF) of a data record x with m features in a dataset X is defined as shown in the equation below. An outlier factor computation is a modified holo-entropy approach that returns a variable called an outlier factor for each behavior in a digital profile. The OF is calculated by taking a data set X (e.g., an intended state and one or more behaviors from a digital profile) that includes information indicative of behavior x (e.g., a behavior from the digital profile) with m features, where the $i^{th}$ feature is represented by $y_i$:

$$OF(x) = \sum_{i=1}^{m} \begin{cases} 0 & \text{if } n(x_i) = 1 \\ \omega_X(y_i) \cdot \delta(n(x_i)) & \text{else} \end{cases}$$

where $$\omega_X(y_i) = 2\left(1 - \frac{1}{1 + \exp(-H_x(y_i))}\right)$$

and $H_x(y_i)$ is the normal entropy value of $y_i$. Also, $n(x_i)$ means the number of times $x_t$ appears in the $i^{th}$ feature, and $\delta(x)$ is defined as:

$$\delta(x) = (x-1)\log(x-1) - x \log x.$$

After computing outlier factors for all data records in the dataset X, the data record $x_o$ with the maximum outlier factor is selected as the outlier. Then the record $x_o$ is removed from the dataset. Once $x_o$ is removed from X, entropy is updated for each data record. However, instead of re-computing all outlier factors again, the following equation is used to update each individual feature's entropy $H_{X/x_o}(y_i)$:

$$H_{X\setminus x_o}(y_i) = (1+b)H_x(y_i) - \left[\left(\frac{a}{b} - a\right)\log a - (b+1)\log b\right] - a\begin{cases} 0 & \text{if } n(x_i) = 1 \\ \delta(n(x_i)) & \text{else} \end{cases}$$

A different number of outliers may be removed in different embodiments. In one method, a fixed value K is used as the outlier number. However, in the scenario where all the data records in a dataset have the same outlier factor values (OF(x)), then no data record should be selected as an outlier and removed. But if a fixed number K is used as the outlier number, then K data records will be selected and removed, which is not appropriate for this scenario.

Alternatively, in some observations of real-world data records, the distribution of outlier factors is often one lognormal distribution or the combination of multiple lognormal distributions. If there is only one lognormal distribution, mean and standard deviation are used to determine a threshold in one embodiment. Any appropriate threshold may be selected (e.g., one standard deviation, two standard deviations, etc.) Any outlier factors for a data record that are outside the threshold will be treated as an outlier. In another embodiment, a clustering method is used to create multiple subsets and then outlier factors are computed on each subset.

An intended state may be generated with a short observation period by monitoring behavior data on a plurality of VMs executing one or more candidate processes. An intended state generated with a short observation period may not include information indicative of all permissible behaviors. In this case, the system may return a false positive by identifying a previously unobserved permissible behavior as a security threat. Therefore, in one embodiment a security threat is determined in part by only using a subset of the information indicative of one or more behaviors (e.g., a subset comprising only information indicative of the features that return a "TRUE" value, and one or more features that return a "FALSE" value are ignored). Using a subset of information can reduce the number of false positives.

After outliers are removed from the data set, the collection of features that remain for a process constitute an intended state of the process. A process may also have more than one intended state, which means a process may have more than one collection of features.

When an alarm occurs, the intended states can be used to determine whether the alarm is valid. An alarm can occur when a process behaves in a way that deviates too far from one or more of that process's intended states, which is determined by calculating an outlier factor for each of the features that has been extracted from a process instance. For example, if a data record x, which constitutes a feature or a behavior of a process, is found in a data set X, which is a collection of features and behaviors of the process, and the data record x is determined to be an outlier using the methods described above, then an alarm occurs. The alarm can be communicated to a user or administrator. An alarm can also be stored to be reviewed later. In some embodiments, a remediation broker can take a remedial action in response to the alarm. An example of alarm data is as follows:

id|org_id|type|protocol|remote_port|remote_address|local_port|local_address|created_by_id|created_at
303173|87|IN UDP|null|null|20099|80.74.1.100|2017|2018-02-27 16:47:54.431-08

Figure 3:
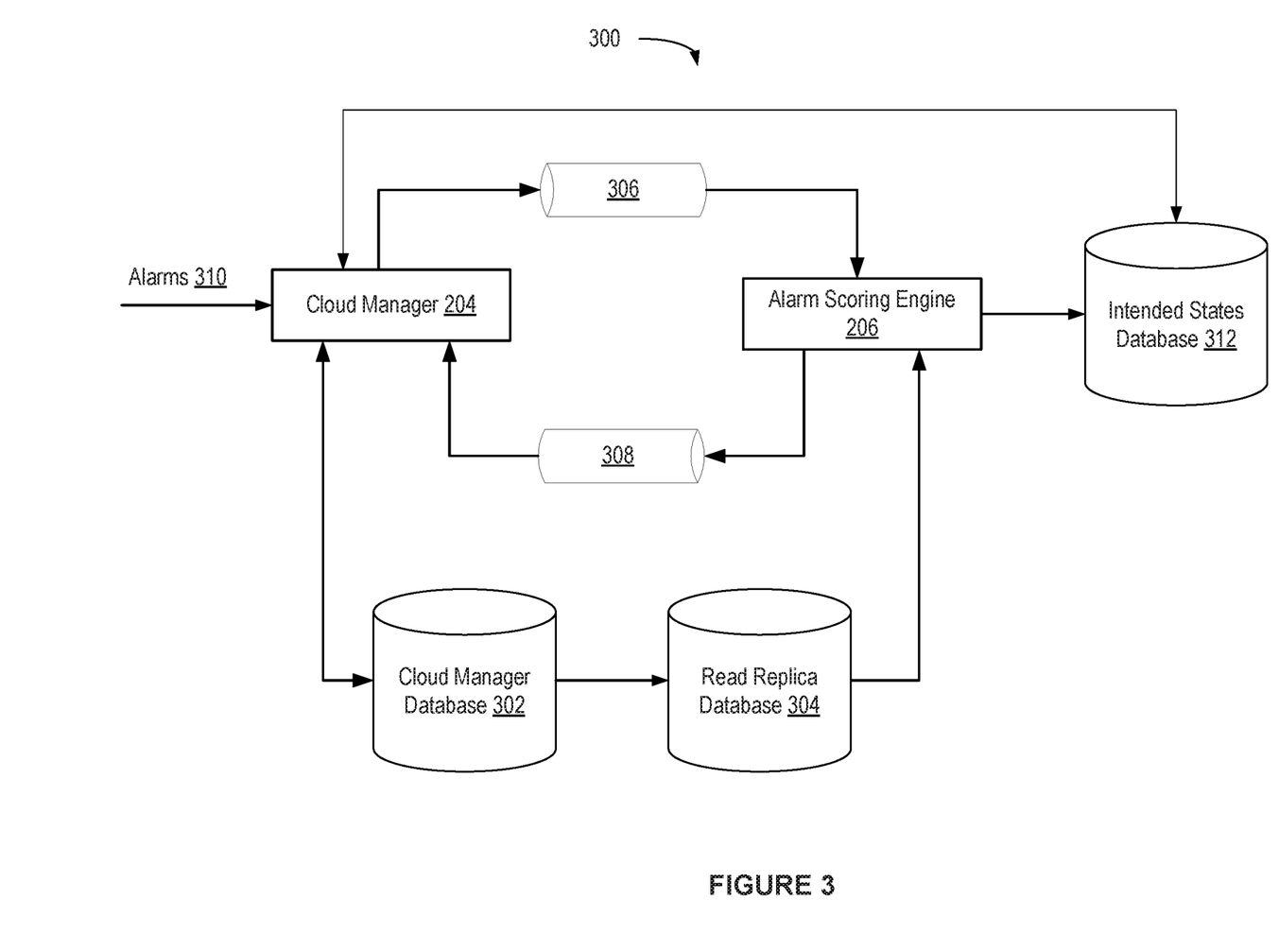
FIG. 3 illustrates an example of an alarm scoring system according to an embodiment.

After receiving this alarm data, the process associated with the alarm data is identified by cloud manager 204 and cloud manager 204 stores the alarm. Then, the intended states database 312 is checked to determine whether intended states are stored for this specific process. Features are extracted from the alarm data by cloud manager 204 using the method described above in connection with Table 2. A test record is created by cloud manager 204 that contains the process and the features associated with the alarm (for examples, the features may be port connections as described above). Then, the holo-entropy outlier detection method is used by alarm scoring engine 206 to determine whether the alarm is normal or abnormal, and an appropriate score is computed.

The score is computed via the following method in one example embodiment. $of_{threshold}$ is the threshold calculated during the process of determining the number of outliers. As described above, the mean and standard deviation can be used to determine a threshold. For example, the $of_{threshold}$ may be an outlier factor that is more than two standard deviations from the mean in one embodiment. Any calculated outlier factor above this threshold denotes an outlier. An outlier factor that is below this threshold denotes a data record that is not an outlier. The maximum outlier factor is $of_{max}$ and the minimum outlier factor is $of_{min}$. These values can also be calculated during calculation of the outlier factors as described above. The maximum outlier factor is the largest outlier factor that was calculated when the outlier factors for the dataset X were computed. The minimum outlier factor is the smallest outlier factor that was calculated when the outlier factors for the dataset X were computed. An administrator can also set a score range for "normal" scores and a score range for "abnormal" scores. A normal score range is defined as between $n_{low}$ and $n_{high}$ and an abnormal score range is between $ab_{low}$ and $ab_{high}$. Normal scores are those scores that are in a range in which the administrator deems the alarm to be less serious than alarms with abnormal scores. The magnitude of the score also provides an indication to an administrator of how critical the alarm is.

The outlier factor $of_{test}$ of the alarm is calculated as described above using the outlier factor equation and the result is used to determine if the alarm is normal or abnormal. If the outlier factor of alarm is above the outlier factor threshold, the score is abnormal. If the outlier factor of alarm is below the outlier factor threshold, the score is normal. The following equations are then used to compute the score s of the alarm. If the test data record is abnormal, the top equation is used. If the test data record is normal, the bottom equation is used.

$$\begin{cases} s = ab_{low} + (ab_{high} - ab_{low}) * \dfrac{(of_{test} - of_{threshold})}{of_{max} - of_{threshold}} & \text{test data record is abnormal} \\ s = n_{low} + (n_{high} - n_{low}) * \dfrac{(of_{test} - of_{min})}{of_{threshold} - of_{min}} & \text{test data record is normal} \end{cases}$$

Abnormal alarms can be handled differently than normal alarms in some embodiments. For example, an abnormal alarm may be handled more critically than a normal alarm. An abnormal alarm may generate a warning to a user or administrator that the alarm needs to be addressed immediately. A normal alarm may generate a different type of warning, and some normal alarms may not need to be addressed immediately. A user or system administrator can create procedures or rules on how different alarms should be handled. In addition, a remediation broker or another component of the system may automatically take one or more actions to address an alarm. Categorizing alarms as either normal or abnormal improves functionality of the system by handling more critical alarms differently than less critical alarms. More critical alarms may be handled more urgently than less critical alarms. Less critical alarms may be held for review and remediation later. A score for each alarm also alerts a user or administrator how critical the alarm is compared to an alarm with a different score.

FIG. 3 illustrates an example of an alarm scoring system 300 according to an embodiment. The workflow of an example embodiment is also illustrated in FIG. 3. First, an alarm 310 occurs and is received by cloud manager 204. The alarm 310 is generated when a process performs an action that deviates from a stored intended state of the process. Cloud manager stores the alarm 310 in cloud manager database 302. Cloud manager database 302 can be storage in a cloud environment, storage in a device, network accessible storage, or any appropriate type of storage in any suitable location. The alarm 310 can be stored in any appropriate location, in cloud 202 or elsewhere.

If the process associated with alarm 310 is modeled in the intended states database 312, cloud manager 204 will send an identifier (ID) associated with the alarm 310 to pending alarm queue 306. Next, alarm scoring engine 206 fetches alarm IDs from pending alarm queue 306. Alarm scoring engine 206 can continually fetch alarm IDs or can fetch alarm IDs on any suitable schedule.

Alarm scoring engine 206 reads alarm data from read replica database 304 of the cloud manager database 302 using the alarm ID. In one embodiment, read replica database 304 contains a copy of all data stored in cloud manager database 302 and synchronizes with database 302 on a predetermined schedule. In this implementation, a read replica database 304 is used instead of reading directly from the cloud manager database 302. Using the read replica database 304 shifts some of the read burden away from cloud manager database 302. If a burst of alarms is occurring, this implementation can improve performance.

Based on the identity of the process associated with the alarm 310, alarm scoring engine 206 fetches the intended states of the process from intended states database 312. By analyzing the alarm data and the intended states data, alarm scoring engine 206 determines whether alarm 310 is an outlier or not using the techniques and equations described above. If the alarm is an outlier, the alarm is abnormal. Alarm scoring engine 206 also determines a score for alarm 310 using the appropriate normal score equation or abnormal score equation depending on whether the alarm is abnormal. Alarm scoring engine 206 sends the results to verification results queue 308.

Cloud manager 204 fetches the results from verification results queue 308. Cloud manager 204 then notifies the user, customer, administrator, etc., of the results of the alarm based on the criteria discussed above. The recipient can then take appropriate action in response to the alarm.

Figure 4:
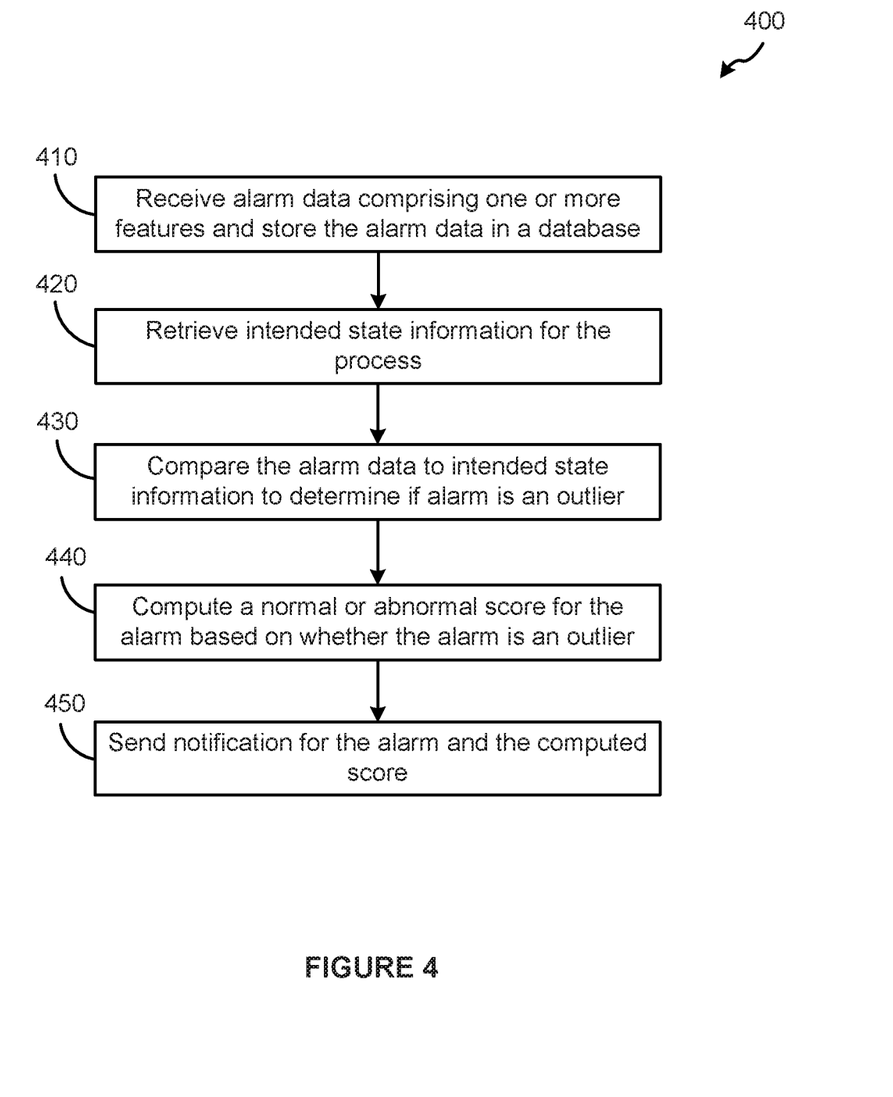
FIG. 4 is a flow diagram illustrating a method for alarm scoring according to an embodiment.

FIG. 4 is a flow diagram that illustrates a method 400 for alarm scoring according to one embodiment. Although the method steps are described in conjunction with FIGS. 1-3, any system configured to perform the method steps, in any suitable order, falls within the scope of the present invention.

The method 400 begins at step 410 where an alarm data related to a process is received and stored in a database. The alarm data comprises one or more features. The method then proceeds to step 420 where intended state information for the process is retrieved. The intended state information is retrieved by cloud manager 204 in one embodiment. The method then proceeds to step 430 where the one or more features of the alarm data are compared to the intended state information by alarm scoring engine 206 to determine if the alarm is an outlier. At step 440, a score comprising a normal score is computed if the alarm is not an outlier and a score comprising an abnormal score is computed if the alarm is an outlier by the alarm scoring engine 206. At step 450, cloud manager 204 sends a notification for the alarm and the computed score to an administrator or other user of the system.

One advantage of the above described embodiments is that an improved outlier detection system is used to determine whether an alarm is valid or not. Another advantage is determining a score that indicates how serious an alarm is.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the client or endpoint and hypervisors as an example for the hardware abstraction layer. As described above, each virtual machine includes a guest operating system in which at least one application runs. These embodiments may also apply to other examples of endpoints/clients, such as containers, which do not include a guest operating system, referred to herein as "OS-less containers." OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for managing an alarm in a virtual machine environment, the method comprising:
   receiving alarm data related to a process running on a virtual machine;
   storing the alarm data in a database, wherein the alarm data comprises a plurality of features of the process, wherein each of the plurality of features is associated with an action of a plurality of actions performed by the process;
   retrieving intended state information for the process;
   calculating an outlier factor with a first equation based on: (i) an entropy value of the plurality of features of the process, and (ii) the intended state information to determine whether the alarm is an outlier, wherein an outlier comprises an outlier factor that falls outside of a first threshold, wherein the alarm is an outlier when at least one feature of the plurality of features of the process, if removed from the alarm data, would reduce, by at least a threshold, an entropy of a data set comprising the alarm data and the intended state information;
   calculating a first score of the alarm with a second equation when the alarm is determined not to be an outlier, the first score calculated based on a minimum outlier factor determined by the first equation, wherein the first score comprises a normal score for the alarm, and calculating a second score of the alarm with a third equation when the alarm is determined to be an outlier, the second score calculated based on a maximum outlier factor determined by the first equation, wherein the second score comprises an abnormal score for the alarm, wherein the normal score falls within a first score range and the abnormal score falls within a second score range; and sending a notification for the alarm and the calculated first score or second score, wherein the abnormal score results in a more critical notification than the normal score.

2. The method of claim 1, wherein a feature of the plurality of features comprises a connection on a port associated with the process.

3. The method of claim 1, wherein intended state information for the process comprises a baseline of behavior for the process.

4. The method of claim 1, wherein intended state information is based on observed behavior of the process and stored in an intended states database.

5. The method of claim 1, further comprising:
taking a remedial action to address the alarm based at least in part on the calculated first score.

6. The method of claim 1, wherein the alarm indicates a deviation by the process from an intended state of the process, and wherein the outlier factor is indicative of whether the alarm is valid.

7. The method of claim 1, wherein one or more of the plurality of features comprise a connection on a port associated with the process, and wherein the alarm data comprises:
one or more of an identifier (ID) of the alarm or an identity of the process;
one or more of a remote address of the connection, remote port number of the connection, a local address of the connection, or a local port number of the connection; or
one or more of a date or a time of the alarm.

8. A non-transitory computer-readable medium storing instructions that, when executed by a computer system, cause the computer system to perform operations for managing an alarm in a virtual machine environment, the operations comprising:
receiving alarm data related to a process running on a virtual machine;
storing the alarm data in a database, wherein the alarm data comprises a plurality of features of the process, wherein each of the plurality of features is associated with an action of a plurality of actions performed by the process;
retrieving intended state information for the process;
calculating an outlier factor with a first equation based on: (i) an entropy value of the plurality of features of the process, and (ii) the intended state information to determine whether the alarm is an outlier, wherein an outlier comprises an outlier factor that falls outside of a first threshold, wherein the alarm is an outlier when at least one feature of the plurality of features of the process, if removed from the alarm data, would reduce, by at least a threshold, an entropy of a data set comprising the alarm data and the intended state information;
calculating a first score of the alarm with a second equation when the alarm is determined not to be an outlier, the first score calculated based on a minimum outlier factor determined by the first equation, wherein the first score comprises a normal score for the alarm, and calculating a second score of the alarm with a third equation when the alarm is determined to be an outlier, the second score calculated based on a maximum outlier factor determined by the first equation, wherein the second score comprises an abnormal score for the alarm, wherein the normal score falls within a first score range and the abnormal score falls within a second score range; and
sending a notification for the alarm and the calculated first score or second score, wherein the abnormal score results in a more critical notification than the normal score.

9. The non-transitory computer-readable medium of claim 8, wherein the operations further comprise:
taking a remedial action to address the alarm based at least in part on the calculated first score.

10. A computer system comprising:
a processor; and
a memory, wherein the memory includes instructions executable by the processor to perform operations for managing an alarm in a virtual machine environment, the operations comprising:
receiving alarm data related to a process running on a virtual machine;
storing the alarm data in a database, wherein the alarm data comprises a plurality of features of the process, wherein each of the plurality of features is associated with an action of a plurality of actions performed by the process;
retrieving intended state information for the process;
calculating an outlier factor with a first equation based on: (i) an entropy value of the plurality of features of the process, and (ii) the intended state information to determine whether the alarm is an outlier, wherein an outlier comprises an outlier factor that falls outside of a first threshold, wherein the alarm is an outlier when at least one feature of the plurality of features of the process, if removed from the alarm data, would reduce, by at least a threshold, an entropy of a data set comprising the alarm data and the intended state information;
calculating a first score of the alarm with a second equation when the alarm is determined not to be an outlier, the first score calculated based on a minimum outlier factor determined by the first equation, wherein the first score comprises a normal score for the alarm, and calculating a second score of the alarm with a third equation when the alarm is determined to be an outlier, the second score calculated based on a maximum outlier factor determined by the first equation, wherein the second score comprises an abnormal score for the alarm, wherein the normal score falls within a first score range and the abnormal score falls within a second score range; and
sending a notification for the alarm and the calculated first score or second score, wherein the abnormal score results in a more critical notification than the normal score.

11. The computer system of claim 10, wherein the operations further comprise:
taking a remedial action to address the alarm based at least in part on the calculated first score.

* * * * *